(12) United States Patent
Ichikawa et al.

(10) Patent No.: US 11,423,669 B2
(45) Date of Patent: Aug. 23, 2022

(54) EMOTION PREDICTION DEVICE, METHOD, PROGRAM, AND VEHICLE

(71) Applicant: TOYOTA JIDOSHA KABUSHIKI KAISHA, Toyota (JP)

(72) Inventors: Midori Ichikawa, Toyota (JP); Toshiya Satake, Toyota (JP); Yasunao Yoshizaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 17/105,869

(22) Filed: Nov. 27, 2020

(65) Prior Publication Data

US 2021/0241009 A1     Aug. 5, 2021

(30) Foreign Application Priority Data

Feb. 5, 2020 (JP) .............................. JP2020-017904

(51) Int. Cl.
*G06V 20/59* (2022.01)
*G06V 40/20* (2022.01)
*G06V 40/16* (2022.01)

(52) U.S. Cl.
CPC ............ *G06V 20/59* (2022.01); *G06V 40/174* (2022.01); *G06V 40/20* (2022.01)

(58) Field of Classification Search
CPC ...... G06V 20/59; G06V 40/174; G06V 40/20; B60R 16/02
See application file for complete search history.

(56) References Cited

U.S. PATENT DOCUMENTS

| | | | |
|---|---|---|---|
| 2013/0253770 A1* | 9/2013 | Nishikawa | B62D 7/159 701/1 |
| 2016/0014547 A1* | 1/2016 | Yae | H04W 4/80 455/418 |
| 2017/0105662 A1* | 4/2017 | Silawan | A61B 5/165 |
| 2018/0061415 A1* | 3/2018 | Penilla | G10L 15/063 |
| 2018/0174449 A1* | 6/2018 | Nguyen | G08G 1/08 |
| 2018/0359611 A1* | 12/2018 | McNabb | H04W 4/40 |
| 2019/0232974 A1* | 8/2019 | Reiley | G06V 20/597 |
| 2019/0309721 A1* | 10/2019 | Siddiqui | F02N 11/0833 |
| 2020/0307643 A1* | 10/2020 | Ikeda | H04W 4/44 |
| 2020/0365015 A1* | 11/2020 | Nguyen | G08G 1/0129 |
| 2020/0388387 A1* | 12/2020 | Rebolledo Mendez | A63H 3/003 |
| 2021/0044610 A1* | 2/2021 | Kishikawa | H04L 12/40 |
| 2021/0086796 A1* | 3/2021 | Yamasaki | B60W 50/14 |

(Continued)

FOREIGN PATENT DOCUMENTS

JP       2008146318 A     6/2008

*Primary Examiner* — Ming Y Hon
(74) *Attorney, Agent, or Firm* — Oliff PLC

(57) ABSTRACT

An emotion prediction device mounted on a vehicle includes a control unit. The control unit is capable of executing functions of a first prediction unit configured to predict an emotion of a user based on a facial expression of the user, a second prediction unit configured to predict an emotion of the user based on the motion of the user, and a third prediction unit configured to predict the emotion of the user based on the emotion predicted by the first prediction unit and the emotion predicted by the second prediction unit. The control unit is capable of restricting execution of at least a part of the functions of the first, second, and third prediction units, based on at least a processing load of the control unit.

11 Claims, 3 Drawing Sheets

(56) References Cited

U.S. PATENT DOCUMENTS

2021/0097370 A1\* 4/2021 Agnihotram ........... G06N 3/049
2021/0347331 A1\* 11/2021 Hiruta ................... B60R 16/037

\* cited by examiner

EMOTION PREDICTION DEVICE, METHOD, PROGRAM, AND VEHICLE

CROSS-REFERENCE TO RELATED APPLICATION

This application claims priority to Japanese Patent Application No. 2020-017904 filed on Feb. 5, 2020, incorporated herein by reference in its entirety.

BACKGROUND

1. Technical Field

The present disclosure relates to a device that predicts an emotion of a user.

2. Description of Related Art

Various technologies have been proposed for capturing an image of a person's face and body, extracting facial expressions, body postures, and motions, and predicting emotions based on those pieces of data. For example, Japanese Unexamined Patent Application Publication No. 2008-146318 discloses a technology in which a facial expression map is created by learning, in advance, a correlation between facial expressions and emotions, and emotions are predicted from facial expressions of a person based on the facial expression map.

SUMMARY

Such an emotion prediction function may be implemented by an electronic device, i.e., an electronic control unit (ECU) mounted on a vehicle that predicts emotions of a user aboard the vehicle, thereby being capable of providing various services according to the emotions of the user.

Generally, the emotion prediction process has a high processing load. Therefore, in a case where the ECU that executes the emotion prediction also executes processes of other applications, the load of the emotion prediction process may delay the processes of other applications, or a processor may become overheated such that the processes are forcibly interrupted.

The present disclosure addresses such a shortcoming by providing an emotion prediction device capable of executing an emotion prediction process while reducing influence on other applications.

An emotion prediction device according to one aspect of the present disclosure is mounted on a vehicle and includes a control unit. The control unit is configured to execute functions of a first prediction unit configured to predict an emotion of a user based on a facial expression of the user, a second prediction unit configured to predict an emotion of the user based on a motion of the user, and a third prediction unit configured to predict an emotion of the user based on the emotion predicted by the first prediction unit and the emotion predicted by the second prediction unit. The control unit is configured to restrict execution of at least a part of the functions of the first prediction unit, the second prediction unit, and the third prediction unit, based on at least a processing load of the control unit.

According to the present disclosure, an emotion prediction device restricts the execution of an emotion prediction process based on the processing load of a control unit. Therefore, it is possible to execute the emotion prediction process while reducing the influence on other applications.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

An emotion prediction device according to an embodiment of the present disclosure restricts an emotion prediction process so as to reduce a load of the emotion prediction process when it is predicted that the emotion prediction process cannot be suitably executed, such as a case where a processing load of a central processing unit (CPU) or a graphics processing unit (GPU), included in a control unit, is high, a case where a facial expression of a user cannot be acquired, or a case where it is predicted that motions of the user do not reflect his/her emotions. Accordingly, it is possible to prevent processes of other applications executed by the emotion prediction device from being delayed or stopped. Hereinafter, the present embodiment will be described in detail with reference to drawings.

Configuration

Figure 1:
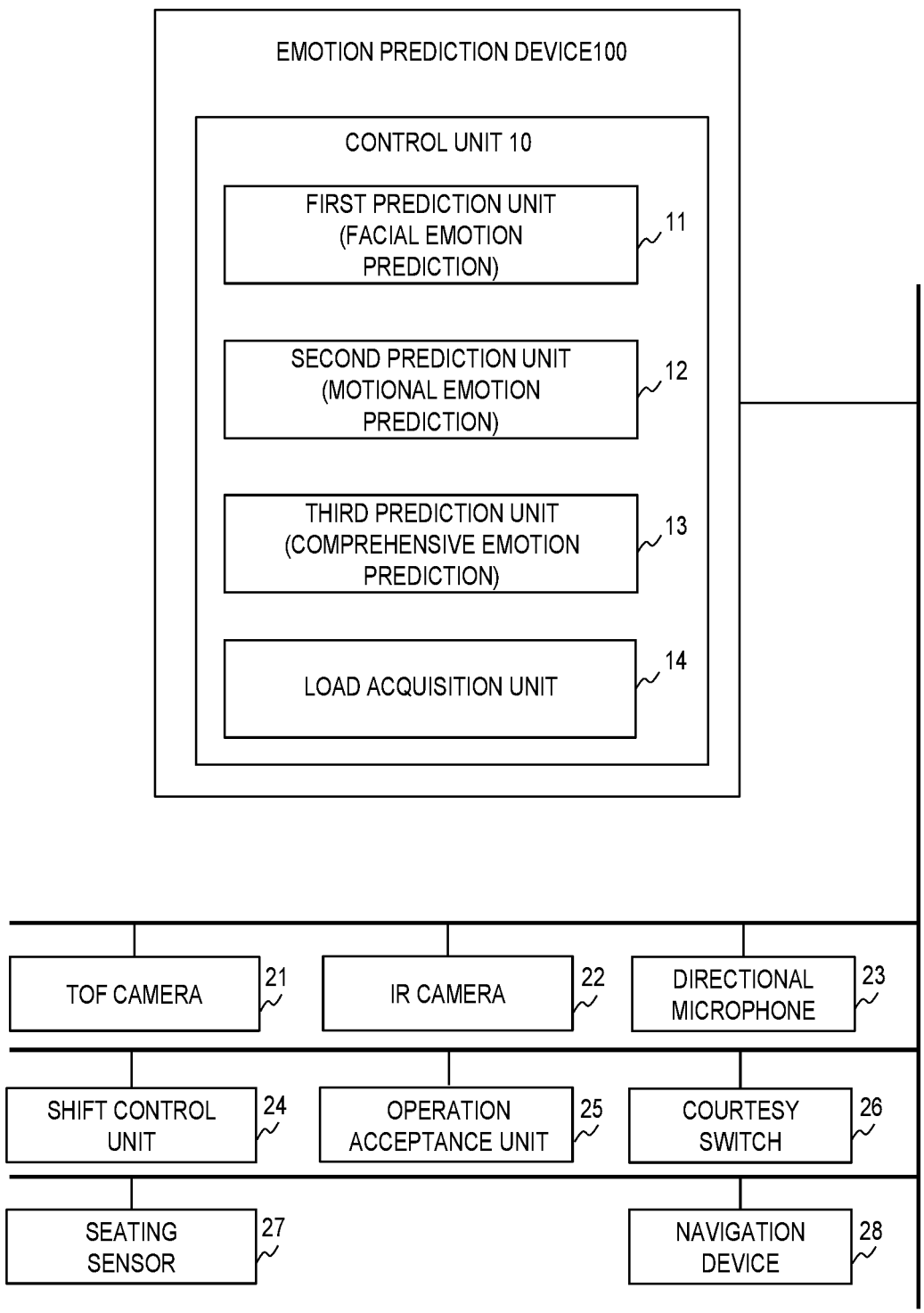
FIG. 1 is a diagram illustrating functional blocks of an emotion prediction device and its peripheral portion according to an embodiment.

FIG. 1 illustrates functional blocks of an emotion prediction device 100 according to the present embodiment. The emotion prediction device 100 includes a first prediction unit 11, a second prediction unit 12, a third prediction unit 13, and a load acquisition unit 14. The functions of these units are executed by a control unit 10. The control unit 10 is a computer typically including a CPU, a GPU, and a memory.

The first prediction unit 11 executes emotion prediction based on a facial expression in which it periodically acquires a captured image of the face of the user, extracts facial expressions, and predicts emotions based on the facial expressions.

The second prediction unit 12 executes emotion prediction based on motion in which it periodically acquires a captured image of the body of the user, extracts the positions and movements of the hands, head, torso, and the like, further extracts the motions specified by the positions and movements thereof, and predicts the user's emotions based on the motions.

The third prediction unit 13 executes comprehensive emotion prediction in which it acquires the facial emotion prediction result by the first prediction unit 11 and the motional emotion prediction result by the second prediction unit 12, and comprehensively predicts the emotions based on these results. In the comprehensive emotion prediction, the accuracy of the emotion prediction can be further enhanced by combining the facial emotion with the motional emotion, as compared to a case where only one of the facial emotion prediction and the motional emotion prediction is executed.

The emotion prediction method executed by each of the first prediction unit 11, the second prediction unit 12, and the third prediction unit 13 is not limited, and various algorithms can be appropriately selected. As a combination of states in which the emotion prediction processes of the prediction units are executed, the following five states can be exemplified.

A first state is a state in which the processes of the first prediction unit 11, the second prediction unit 12, and the third prediction unit 13 are all executed. In this state, the comprehensive emotion prediction result by the third prediction unit 13 is adopted as the emotion prediction result by the emotion prediction device 100. This state is a normal state of the emotion prediction device 100.

A second state is a state where the process of the first prediction unit 11 is executed while the processes of the second prediction unit 12 and the third prediction unit 13 are stopped. In this state, the facial emotion prediction result by the first prediction unit 11 is adopted as the emotion prediction result by the emotion prediction device 100.

A third state is a state where the process of the second prediction unit 12 is executed while the processes of the first prediction unit 11 and the third prediction unit 13 are stopped. In this state, the motional emotion prediction result by the second prediction unit 12 is adopted as the emotion prediction result by the emotion prediction device 100.

A fourth state is a state where the processes of the first prediction unit 11, the second prediction unit 12, and the third prediction unit 13 are all executed, but the cycle of executing each process is longer than in the first state described above. In this state, the comprehensive emotion prediction result by the third prediction unit 13 is adopted as the emotion prediction result by the emotion prediction device 100, as in the first state, but the emotion prediction process is executed less frequently than in the first state.

A fifth state is a state where the processes of the first prediction unit 11, the second prediction unit 12, and the third prediction unit 13 are all stopped. In this state, the emotion prediction executed by the emotion prediction device 100 is stopped.

In the second, third, fourth, and fifth states, the processing loads on the CPU and GPU are lower than those in the first state due to the stopping of the processes or the reduction in the execution frequency.

The load acquisition unit 14 acquires the respective processing loads of the CPU and GPU. For example, the usage rate can be used as an index of the processing load, but an appropriate index may be used according to the configuration of the processor, such as a CPU or GPU, included in the control unit 10, function sharing, and load features of the emotion prediction process.

The control unit 10 controls the state shift of shifting between the first and fifth states based on, for example, the processing load acquired by the load acquisition unit 14 to be described below.

In addition to the emotion prediction process described above, the control unit 10 can execute one or more applications in parallel with the emotion prediction process to implement various functions of a vehicle.

The emotion prediction device 100 is installed in the vehicle and is connected to various devices provided in the vehicle so as to enable communication therebetween via an in-vehicle network. Examples of the various devices include a time-of-flight (TOF) camera 21, an infrared (IR) camera 22, a directional microphone 23, a shift control unit 24, an operation acceptance unit 25, a courtesy switch 26, a seating sensor 27, and a navigation device 28.

The TOF camera 21 and the IR camera 22 are distance image sensors capable of measuring a distance to a subject, and are arranged such that images of the user's body and face in a normal traveling posture can be captured. For example, the first prediction unit 11 may execute the facial emotion prediction process based on the image of the user's face captured by the IR camera 22. In another example, the second prediction unit 12 may execute the motional emotion prediction process based on the image of the user's upper body captured by the TOF camera 21.

The directional microphone 23 is a microphone capable of collecting a voice of the user and specifying, for example, in which direction the user is speaking in a vehicle cabin according to directional characteristics.

The shift control unit 24 is a device that detects and controls gear positions such as P (parking), D (drive), and R (reverse).

The operation acceptance unit 25 is a device that includes buttons, switches, a touchscreen, and the like, and accepts various operations from the user.

The courtesy switch 26 is a sensor that detects opening/closing of a vehicle door.

The seating sensor 27 is a sensor that detects whether the user is seated on a seat.

The navigation device 28 is a device that guides the user along a route and provides information on an estimated arrival time to a destination designated by the user, based on map information and location information of the vehicle acquired by a GPS.

Additionally, a device that acquires the emotion prediction result by the emotion prediction device 100 and uses the result for processing is connected to the in-vehicle network. A device having an agent function for executing a conversation function with the user can be exemplified as such a device.

Process

Figure 2:
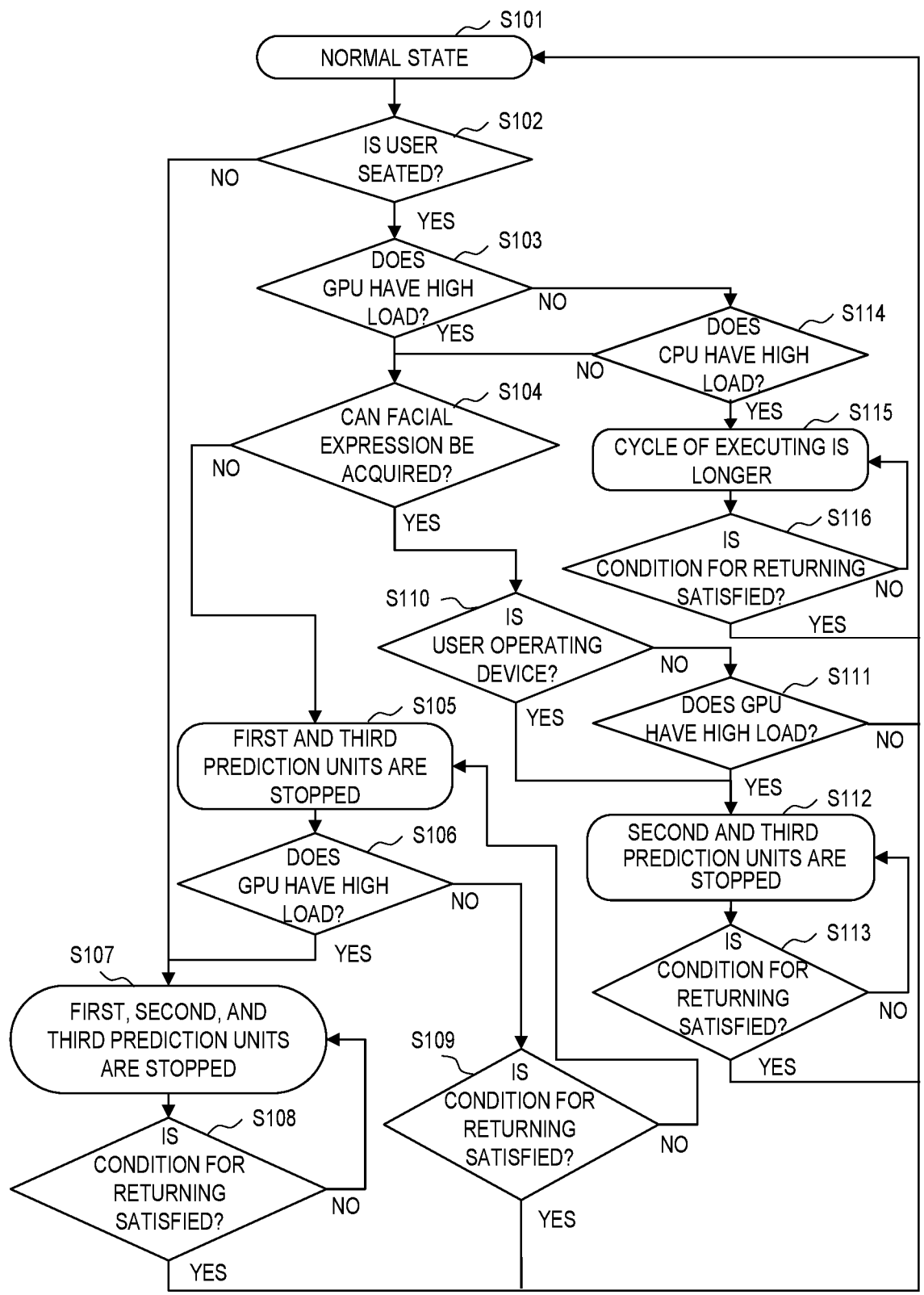
FIG. 2 is a flowchart illustrating a state shift in an emotion prediction process of the emotion prediction device according to the embodiment.

FIG. 2 is a flowchart illustrating a state shift process executed by the control unit 10 of the emotion prediction device 100. The state shift of shifting between the first and fifth states will be described with reference to FIG. 2. The normal state will be described as a starting point. Further, it is assumed that the emotion prediction device 100 predicts the emotion of the user seated in a driver's seat.

Step S101: The control unit 10 sets the execution state of the emotion prediction process to the normal state (first state) in which the processes of the first prediction unit 11, the second prediction unit 12, and the third prediction unit 13 are all executed.

Step S102: The control unit 10 determines whether the user is seated in the driver's seat. For example, the control unit 10 can make the determination based on the detection result of the seating sensor 27. In a case where it is determined that the user is seated in the driver's seat, the process proceeds to step S103, and in a case where it is determined that that the user is not seated, the process proceeds to step S107. Moreover, the detection result of the seating sensor 27 is combined with the detection of the opening/closing of a door of the driver's seat by the courtesy switch 26. For example, it is determined that the user is seated in the driver's seat in a case where the courtesy switch 26 detects the opening of the door, the seating sensor 27 detects the fact that the user is seated, and then the courtesy switch 26 further detects the closing of the door. Accordingly, whether the user is seated can be determined more accurately.

Step S103: The control unit 10 determines whether the GPU has a high load based on the processing load of the GPU acquired from the load acquisition unit 14. For example, the control unit 10 can determine that the load is high when the processing load of the GPU is equal to or higher than a first value, and can determine that the load is not high when the processing load thereof is lower than the first value. In a case where it is determined that the GPU has a high load, the process proceeds to step S104, and otherwise, the process proceeds to step S114.

Step S104: The control unit 10 determines whether the facial expression of the user can be acquired. For example, when it is detected that the user's voice acquired from the directional microphone 23 is directed from the driver's seat toward a rear seat, the control unit 10 can determine that the user is facing toward the rear seat to have a conversation with the passenger seated in the rear seat, thus an image of the user's face cannot be captured and the facial expression cannot be acquired. Alternatively, for example, when it is detected that the shift position acquired from the shift control unit 24 is "R", which indicates that the vehicle is traveling in reverse, the control unit 10 can determine that the user's face is facing the rear side so as to check the rear side, thus an image of the user's face cannot be captured and the facial expression cannot be acquired. Further, in a case where the current state does not correspond to any of the states defined as a state where an image of the face cannot be captured, it can be determined that the user's facial expression can be acquired. In a case where it is determined that the user's facial expression can be acquired, the process proceeds to step S110, and in a case where it is determined that that the user's facial expression cannot be acquired, the process proceeds to step S105.

Step S105: The control unit 10 sets the execution state of the emotion prediction process to the state (third state) in which the process of the second prediction unit 12 is executed while the processes of the first prediction unit 11 and the third prediction unit 13 are stopped.

Step S106: The control unit 10 determines whether the GPU has a high load based on the processing load of the GPU acquired from the load acquisition unit 14. For example, the control unit 10 can determine that the load is high when the processing load of the GPU is equal to or higher than a second value, and that the load is not high when the processing load thereof is lower than the second value. In a case where it is determined that the GPU has a high load, the process proceeds to step S107, and when it is determined that the GPU does not have a high load, the process proceeds to step S109.

Step S107: The control unit 10 sets the execution state of the emotion prediction process to the state (fifth state) in which the processes of the first prediction unit 11, the second prediction unit 12, and the third prediction unit 13 are all stopped.

Step S108: The control unit 10 determines whether a condition under which the fifth state is to be returned to the first state is satisfied. The condition under which the fifth state is to be returned to the first state is that the user is seated and the user's facial expression can be acquired. Whether the user is seated can be determined in the same manner as in step S102. Further, whether the user's facial expression can be acquired can be determined in the same manner as in step S104. In a case where the condition under which the fifth state is to be returned to the first state is satisfied, the process proceeds to step S101, and when the condition thereunder is not satisfied, the process proceeds to step S107.

Step S109: The control unit 10 determines whether a condition under which the third state is to be returned to the first state is satisfied. The condition under which the third state is to be returned to the first state is that the user's facial expression can be acquired and the GPU does not have a high load. Whether the user's facial expression can be acquired can be determined in the same manner as in step S104. Further, if the processing load of the GPU acquired from the load acquisition unit 14 is lower than a third value, it can be determined that the GPU does not have a high load. In a case where the condition under which the third state is to be returned to the first state is satisfied, the process proceeds to step S101, and when the condition thereunder is not satisfied, the process proceeds to step S105.

Step S110: The control unit 10 determines whether the user is operating the device. For example, upon acquiring, from the navigation device 28, the operation acceptance unit 25, or the like, information indicating that the user is operating a button provided on the navigation device 28 or an instrument panel, the control unit 10 can determine that the user is operating the device. In a case where the user is operating the device, the motion by the user is for operating the device and is unlikely to reflect the user's emotion. In a case where it is determined that the user is operating the device, the process proceeds to step S112, and when it is determined that the user is not operating the device, the process proceeds to step S111.

Step S111: The control unit 10 determines whether the GPU has a high load based on the processing load of the GPU acquired from the load acquisition unit 14. For example, the control unit 10 can determine that the load is high when the processing load of the GPU is equal to or higher than a fourth value, and can determine that the load is not high in a case where the processing load thereof is lower than the fourth value. In a case where it is determined that the GPU has a high load, the process proceeds to step S112, and when it is determined that the GPU does not have a high load, the process proceeds to step S101.

Step S112: The control unit 10 sets the execution state of the emotion prediction process to the state (second state) in which the process of the first prediction unit 11 is executed while the processes of the second prediction unit 12 and the third prediction unit 13 are stopped.

Step S113: The control unit 10 determines whether a condition under which the second state is to be returned to the first state is satisfied. The condition under which the second state is to be returned to the first state is that the user is not operating the device and the GPU does not have a high load. Whether the user is operating the device can be determined in the same manner as in step S110. Further, if the processing load of the GPU acquired from the load acquisition unit 14 is lower than a fifth value, it can be determined that the GPU does not have a high load. In a case where the condition under which the second state is to be returned to the first state is satisfied, the process proceeds to step S101, and when the condition thereunder is not satisfied, the process proceeds to step S112.

Step S114: The control unit 10 determines whether the CPU has a high load based on the processing load of the CPU acquired from the load acquisition unit 14. For example, the control unit 10 can determine that the load is high when the processing load of the CPU is equal to or higher than a sixth value, and can determine that the load is not high in a case where the processing load thereof is lower than the sixth value. In a case where it is determined that the CPU has a high load, the process proceeds to step S115, and when it is determined that the CPU does not have a high load, the process proceeds to step S104.

Step S115: The control unit 10 sets the execution state of the emotion prediction process to the state (fourth state) in which the processes of the first prediction unit 11, the second prediction unit 12, and the third prediction unit 13 are all executed but the cycle of executing each process is longer than in the first state.

Step S116: The control unit 10 determines whether a condition under which the fourth state is to be returned to the first state is satisfied. The condition under which the fourth state is to be returned to the first state is that the GPU does not have a high load and the CPU does not have a high load. If the processing load of the GPU acquired from the load acquisition unit 14 is lower than a seventh value, it can be determined that the GPU does not have a high load. If the processing load of the CPU acquired from the load acquisition unit 14 is lower than an eighth value, it can be determined that the CPU does not have a high load. In a case where the condition under which the fourth state is to be returned to the first state is satisfied, the process proceeds to step S101, and in a case where the condition thereunder is not satisfied, the process proceeds to step S115.

With such a state shift process, the execution state of the emotion prediction process by the emotion prediction device 100 is switched. Consequently, in a case where the processing load of the CPU or GPU is high, or in a case where the emotion prediction process cannot be executed appropriately due to, for example, the posture of the user, the emotion prediction process is curbed to reduce the load, and thus it is possible to prevent the processing of other applications executed by the control unit 10 from being delayed or stopped. The first to eighth values used for determining the load, described above, may be different therefrom or the same as described.

Further, in step S109, in a case where the condition under which the third state is to be returned to the first state and an additional condition to be described below is further satisfied, the control unit 10 may proceed to step S101, and in a case where the condition thereunder is not satisfied, the process proceeds to step S105. Further, in step S113, in a case where the condition under which the second state is to be returned to the first state and the additional condition to be described below is further satisfied, the control unit 10 may proceed to step S101, and in a case where the condition thereunder is not satisfied, the process proceeds to step S112. The additional condition may be satisfied when, for example, any one of the following conditions is satisfied.

(1) The user's voice is detected by the directional microphone 23 or another microphone provided in the vehicle.

(2) Music is played by an audio device provided in the vehicle.

(3) The seating sensor 27 detects one or both of passengers seated in the rear seat and a passenger seated in the passenger seat. Alternatively, the courtesy switch 26 detects the opening/closing of a passenger seat door or a rear door.

(4) The vehicle has arrived at the destination set in the navigation device 28.

In a case where the additional condition is satisfied, it is highly likely that the user's emotions have changed or are likely to change. If the state is shifted to the first state when such an additional condition is satisfied, the emotion prediction process can be further curbed and the load can be reduced.

Further, in a case where the possibility that the user's emotion will not change continues to be high, the control unit 10 may reduce the execution frequency of the emotion prediction process. For example, while the predicted arrival time to the destination derived by the navigation device 28 is delayed each time it is updated due to, for example, traffic congestion, the possibility that the user's annoyance will not change continues to be high. Thus the first state may be replaced by the fourth state in the state shift process described above.

Figure 3:
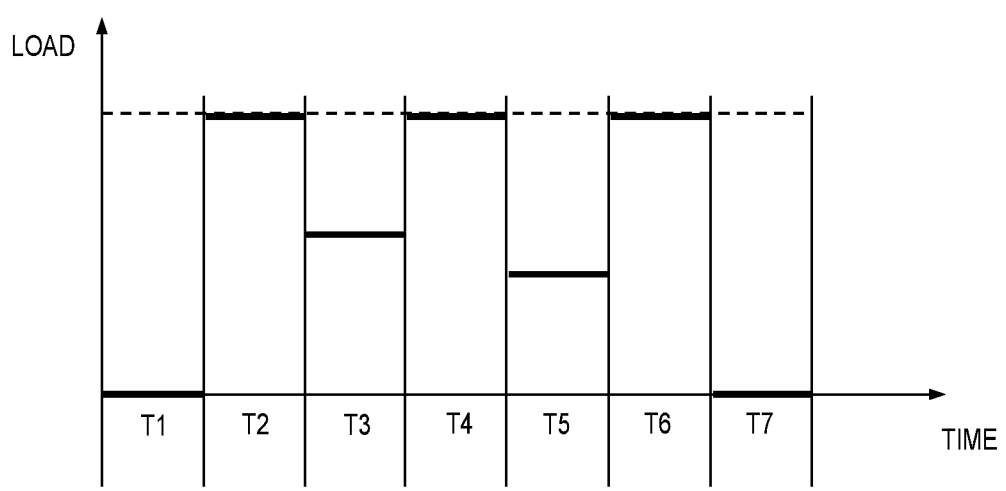
FIG. 3 is a diagram illustrating an effect of reducing a processing load of the emotion prediction device according to the embodiment.

FIG. 3 is a diagram schematically illustrating an effect of reducing the processing load of the emotion prediction process according to the present embodiment. In FIG. 3, the load of the emotion prediction process in the present embodiment is represented by a solid line, and for comparison, the load of a case where the state (first state) in which the processes of the first prediction unit 11, the second prediction unit 12, and the third prediction unit 13 are all executed is maintained is represented by a dotted line.

Periods T1 to T7 illustrated in FIG. 3 are periods in which the user is not aboard the vehicle. In those periods, the processes of the first prediction unit 11, the second prediction unit 12, and the third prediction unit 13 are all stopped (fifth state).

Further, periods T2, T4, and T6 are periods in which the user is seated, the user's facial expression can be acquired, the user is not operating the device, and the control unit 10 does not have a high load. In those periods, the processes of the first prediction unit 11, the second prediction unit 12, and the third prediction unit 13 are all executed (first state).

Further, periods T3 and T5 are periods in which the user's facial expression cannot be acquired, the user is operating the device, or the control unit 10 has a high load. In those periods, the processes of the first prediction unit 11, the second prediction unit 12, and the third prediction unit 13 are partially restricted (any one of the second to fourth states).

As illustrated in FIG. 3, in periods T1, T3, T5, and T7, the load on the control unit 10 that executes the emotion prediction process is curbed as compared with a case where the state (first state) in which the processes of the first prediction unit 11, the second prediction unit 12, and the third prediction unit 13 are all executed is maintained.

Advantageous Effects

In the embodiment described above, the emotion prediction process is restricted to reduce the load of the emotion prediction process in a case where it is predicted that the emotion prediction process cannot be suitably executed, such as a case where the processing load of the CPU or GPU is high, a case where the user's facial expression cannot be acquired, or a case where it is predicted that the user's motion does not reflect his/her emotions. Accordingly, it is possible to prevent processes of other applications executed by the emotion prediction device 100 from being delayed or stopped.

Further, in the embodiment, it is possible to determine whether the user is seated, whether the user's facial expression can be acquired, or whether the user is operating the device, without depending on the image processing based on the image data acquired from the image sensors, such as the TOF camera 21 and the IR camera 22, which is generally required for the processing having a high load. Consequently, the determination as to whether the execution state is to be shifted can be made while the processing load is curbed.

As described above, a technology according to one embodiment of the present disclosure has been described. However, the state shift process described above may be appropriately modified in the present disclosure, as long as the load of the emotion prediction process can be reduced in a case where the emotion prediction process is difficult or unnecessary. For example, the details of restricting the functions of the first prediction unit, the second prediction unit, and the third prediction unit are not limited to those described in the embodiment. Further, for example, in the embodiment described above, it is assumed that the user is seated in the driver's seat, but a user seated in another seat, such as the passenger seat, may be a subject of the emotion prediction.

The present disclosure is not limited to the emotion prediction device, but encompasses a method executed by a computer (processor) included in the emotion prediction device, a program, a computer-readable non-transitory recording medium storing the program, and a vehicle including the emotion prediction device.

The present disclosure is useful for a device that executes emotion prediction.

What is claimed is:

1. An emotion prediction device mounted on a vehicle, the emotion prediction device comprising:
a control unit programmed to:
execute a first function of predicting an emotion of a user based on a facial expression of the user;
execute a second function of predicting an emotion of the user based on a motion of the user;
execute a third function of predicting an emotion of the user based on the emotion predicted by the first function and the emotion predicted by the second function; and
determine whether the facial expression of the user can be acquired,
wherein the control unit is programmed to restrict execution of at least a part of the first function, the second function, and the third function, based on a determination result of whether the facial expression can be acquired.

2. The emotion prediction device according to claim 1, wherein the restriction of the execution includes stopping or extending a cycle of executing any one of the first function, the second function, and the third function.

3. The emotion prediction device according to claim 1, wherein the control unit is programmed to determine a state of the user or the vehicle, and restrict the execution based on the determination result.

4. The emotion prediction device according to claim 3, wherein the control unit is programmed to, upon determining that the user is not seated, stop execution of the first function, the second function, and the third function, as the restriction of the execution.

5. The emotion prediction device according to claim 3, wherein, the control unit is programmed to, upon determining that the facial expression of the user is not acquirable, stop the first function and the third function, as the restriction of the execution.

6. The emotion prediction device according to claim 3, wherein the control unit is programmed to, upon determining that the user is operating a predetermined device, stop the second function and the third function, as the restriction of the execution.

7. The emotion prediction device according to claim 3, wherein the control unit is programmed not to use any information acquired from one or more image sensors provided in the vehicle to determine whether the restriction of the execution is executed.

8. A vehicle comprising the emotion prediction device according to claim 1.

9. The emotion prediction device according to claim 1, wherein the control unit is programmed to restrict execution of the first function and the third function when the control unit determines that the facial expression of the user cannot be acquired.

10. An emotion prediction method executed by a computer of an emotion prediction device mounted on a vehicle, the emotion prediction method comprising:
a first prediction step of predicting an emotion of a user based on a facial expression of the user;
a second prediction step of predicting an emotion of the user based on a motion of the user;
a third prediction step of predicting an emotion of the user based on the emotion predicted in the first prediction step and the emotion predicted in the second prediction step;
a determining step to determine whether the facial expression of the user can be acquired; and
an execution restriction step of restricting execution of at least a part of the first prediction step, the second prediction step, and the third prediction step, based on a result of whether the facial expression can be acquired from the determining step.

11. A computer-readable non-transitory storage medium that stores an emotion prediction program causing a computer of an emotion prediction device mounted on a vehicle to execute:
a first prediction step of predicting an emotion of a user based on a facial expression of the user;
a second prediction step of predicting an emotion of the user based on a motion of the user;
a third prediction step of predicting an emotion of the user based on the emotion predicted in the first prediction step and the emotion predicted in the second prediction step;
a determining step to determine whether the facial expression of the user can be acquired; and
an execution restriction step of restricting execution of at least a part of the first prediction step, the second prediction step, and the third prediction step, based on a result of whether the facial expression can be acquired from the determining step.

* * * * *